(12) United States Patent
Mathis

(10) Patent No.: US 8,389,270 B1
(45) Date of Patent: Mar. 5, 2013

(54) COMPOSITIONS AND METHODS FOR WASTE BIOREMEDIATION

(76) Inventor: Mark Joseph Mathis, Silverthorne, CO (US)

( * ) Notice: Subject to any disclaimer, the term of this patent is extended or adjusted under 35 U.S.C. 154(b) by 0 days.

(21) Appl. No.: 13/363,063

(22) Filed: Jan. 31, 2012

Related U.S. Application Data

(60) Provisional application No. 61/541,788, filed on Sep. 30, 2011.

(51) Int. Cl.
*A62D 3/00* (2007.01)
*D06M 16/00* (2006.01)

(52) U.S. Cl. .................... 435/262.5; 435/264

(58) Field of Classification Search ............... 435/262.5, 435/264
See application file for complete search history.

(56) References Cited

U.S. PATENT DOCUMENTS

| | | |
|---|---|---|
| 5,486,474 A | 1/1996 | Bradley et al. |
| 5,656,490 A | 8/1997 | Wyatt et al. |
| 6,027,652 A | 2/2000 | Hondroulis et al. |
| 6,187,581 B1 | 2/2001 | Sicotte et al. |
| 6,617,150 B1 | 9/2003 | Hince |

OTHER PUBLICATIONS

Mitchell et al. (A bug in the system. CALS News. Dated Monday, Feb. 28, 2011).*
Winder et al. (Dominant bacteria associated with broods of mountain pine beetle, *Dendrocotnus ponderosae Coleoptera curculiondae*, Scolytina J. Entomol. Soc. Brit. Columbia. Dec. 2010, p. 43-56).*
Hawk et al. (in a response to the article "Real Bioremediation Solutions". May 25, 2010).*
Tumulru et al. (A Technical Review on Biomass Processing: Densification, Preprocessing, Modeling and Optimization. 2010 ASABE Annual International Meeting. Jun. 2010).*

* cited by examiner

*Primary Examiner* — Karen Cochrane Carlson
*Assistant Examiner* — Natalie Moss
(74) *Attorney, Agent, or Firm* — Polsinelli Shughart PC

(57) ABSTRACT

The present invention relates to compositions and methods for the bioremediation of hydrocarbon-containing waste, such as drill mud and drill cuttings from oil and gas wellbores, drill waste deposit sites, oil spills, oil and gas production waste, and contaminated surfaces, using wood chips comprising microorganisms of mountain pine beetle.

11 Claims, No Drawings

US 8,389,270 B1

COMPOSITIONS AND METHODS FOR WASTE BIOREMEDIATION

CROSS-REFERENCE TO RELATED APPLICATIONS

This claims the benefit of U.S. Provisional Patent Application No. 61/541,788, filed on Sep. 30, 2011, the contents of which are incorporated herein by reference.

BACKGROUND OF THE INVENTION

1. Field of the Invention

The present invention relates to waste bioremediation. More particularly, the present invention relates to compositions and methods for the bioremediation of hydrocarbon-containing waste, such as drill mud and drill cuttings from oil and gas wellbores, drill waste deposit sites, oil spills, and contaminated surfaces.

2. Description of the Related Art

Drilling wells to recover of oil and gas is typically accomplished by using a rig to drill the well with a hollow drill string. As the well is being drilled, drilling mud is pumped down the bore of the string. The drilling mud is used to control subsurface pressures, lubricate the drill bit, stabilize the well bore, and carry to the surface the cuttings produced by the drill bit by grinding rocks into small pieces. The solids are separated from the mud to return the mud to the recirculating mud system and make the solids easier to handle. The cuttings separated from the mud at shale shakers or other mechanical processors are often coated with so much mud that they are unsuitable for the next reuse or disposal step or are difficult or handle or transport. The constituents of the cuttings or the mud coating of the cuttings may leach from the waste, making them unsuitable for land application or burial approaches.

Traditional waste management methods include solidifying and stabilizing the cuttings and the mud coating using additives. Typically, cement, fly ash, lime, saw dust, and calcium oxide are used as solidification/stabilization additives for bioremediating drill cuttings and other types of wet solids. Other additives include medium-ground mica-based material, fine-ground mica, mixtures of recycled cellulose fibers, walnut nut plug, and pecan nut plug. However, not all drilling wastes are amenable to chemical fixation and stabilization treatments. Many additives either do not achieve the desired goals once the solidified or stabilized wastes are placed into the environment or the cost of using the additives is prohibitive. Most of the traditional solidification/stabilization systems produce conditions both of high pH and high total alkalinity. Much concern has been expressed about the long-term stability of such processes. Of greatest concern is the failure of the additives to keep the waste constituents from releasing into the environment over the long term or the sudden release of contaminants due to breakdown of the matrix.

Similar waste management problems also exist with oil spills, including releases of crude oil from tankers, offshore platforms, drilling rigs and wells, as well as spills of refined petroleum products (such as gasoline, diesel) and their by-products, and heavier fuels used by large ships such as bunker fuel, or the spill of any oily refuse or waste oil. Spills may take months or even years to clean up. Dispersants are often used in an attempt to clean oil spills. Dispersants act as detergents, clustering around oil globules and allowing the oil to be carried away in the water. Smaller oil droplets, scattered by currents, may cause less harm and may degrade more easily. But the dispersed oil droplets infiltrate into deeper water and can lethally contaminate coral and break the balance of the aquatic system, affect environmental safety and damage the health of all life forms in the food chain. Oil spills also occur in the ground where pipelines are located. There is also the problem of landfills used to store oil-related wastes.

Therefore, there is a need for an effective and cost efficient system and methods for eliminating pollutants from a wide range of sources.

SUMMARY OF THE INVENTION

Provided herein is a composition comprising a plurality of wood particles, which may comprise a microorganism associated with a mountain pine beetle. The wood may be a lodgepole pine, ponderosa pine, Scotch pine, whitebark pine, limber pine, Douglas-fir, blue spruce, *Pinus contorta*, beech, western scrub, north coast scrub, or sand, shore or knotty pine. The microorganism may be a *Grosmannia clavigera, Ophiostoma clavigerum, Ophiostoma montium, Leptographium longiclavaturn, Entomocorticium, Entomocorticium dendroctoni, Ophiostoma montium, Ceratocystiopsis manitobensis, Pichia capsulate, Pichia scolytii, Pichia holstii, Bacillus subtilis, Pseudomonas*, or *Alcaligenes faecalis*.

The wood particles may have a moisture content of 4% to 25%, and may not comprise wood particles with a moisture content that is outside the range of 4% to 25%. The wood particles may also have a moisture content of 5% to 20%, and may not comprise wood particles with a moisture content that is outside the range of 5% to 20%. The wood particles may have a moisture content of 5% to 15%, and may not comprise wood particles with a moisture content that is outside the range of 5% to 15%. The wood particles may also have a moisture content of 5% to 10%, and may not comprise wood particles with a moisture content that is outside the range of 5% to 10%.

The wood particles may have a width of $1/32$ to $1/2$ inches, and may not comprise wood particles outside the range of $1/32$ to $1/2$ inches. The wood particles may also have a width of $1/16$ to $3/8$ inches, and may not comprise wood particles outside the range of $1/16$ to $3/8$ inches. The wood particles may have a width of $1/4$ to $1/8$ inches, and may not comprise wood particles outside the range of $1/4$ to $1/8$ inches.

The composition may further comprise a nitrogen source, an oxygen source, a calcium source, a magnesium source, or a phosphorous source. The composition may also further comprise a microbial growth accelerator.

Also provided herein is a method of making wood particles, which may comprise providing a wood chip derived from a wood source affected by a microorganism associated with a mountain pine beetle. The wood may be lodgepole pine, ponderosa pine, Scotch pine, whitebark pine, limber pine, Douglas-fir, blue spruce, *Pinus contorta*, beech, western scrub, north coast scrub, or sand, shore or knotty pine. The microorganism may be *Grosmannia clavigera, Ophiostoma clavigerum, Ophiostoma montium, Leptographium longiclavatum, Entomocorticiurn, Entomocorticium dendroctoni, Ophiostoma montium, Ceratocystiopsis manitobensis, Pichia capsulate, Pichia scolytii, Pichia holstii, Bacillus subtilis, Pseudomonas*, or *Alcaligenes faecalis*. The method may also comprise dehydrating the wood chip to a moisture content of 4%-25%. The wood chip may be dehydrated at 160° F. to 350° F. for 6-60 minutes. The method may comprise densifying the wood chip to produce the wood particles. The wood chip may be densified by extrusion. The method may further comprise separating the wood particles based on particle width. Wood particles with a width range of $1/32$ to $1/2$ inches may be isolated.

Further provided herein is a method of bioremediating hydrocarbon-containing waste. The method may comprise providing a wood particle derived from a wood source affected by a mountain pine beetle. The wood particle may be contained in a composition of wood particles described herein. The waste may be contacted with the wood particle. The waste may be drill fluid, drill cutting, drill mud, contaminated soil, drilling sink hole, oil pipeline leakage, oil and gas production waste, waste landfill, or an oil spill.

DETAILED DESCRIPTION

The inventors have made the discovery that wood particles derived from a mountain pine beetle-infected wood source are surprisingly able to bioremediate hydrocarbon waste more effectively than wood particles derived from other sources. Mountain pine beetles infect certain trees by laying eggs under the bark. The mountain pine beetles apparently evade normal tree defenses due to various microorganisms with which they have symbiotic relationships. Without being bound by theory, it is believed that microorganisms associated with the mountain pine beetles are able to metabolize hydrocarbon waste that has been solidified and stabilized using wood particles. Wood particles comprising mountain pine-associated microorganisms, therefore, may be used for the bioremediation of hydrocarbon waste or other pollutants.

1. Wood Particle

Provided herein is a wood particle, which may comprise a microorganism associated with a mountain pine beetle (MPB). As used to describe a microorganism contained in the wood particle, "comprise," means that the microorganism is alive, in a dormant state, or dead. The dead microorganism may comprise an enzyme or chemical that has an activity for bioremediating hydrocarbon-containing waste. The microorganism may be the blue stain fungus *Grosmannia clavigera*, which may be introduced into the sapwood of an infected tree by a mountain pine beetle. The microorganism may also be *Ophiostoma clavigerum*, *Ophiostoma montium*, *Leptographium longiclavatum*, *Entomocorticium*, *Entomocorticium dendroctoni*, *Ophiostoma montium*, *Ceratocystiopsis manitobensis*, *Pichia capsulate*, *Pichia scolytii*, *Pichia holstii*, *Bacillus subtilis*, *Pseudomonas*, or *Alcaligenes faecalis*.

The wood particle may be derived from any wood source affected by a MPB. The MPB may affect the wood source by killing it, or substantially killing it. Mountain pine beetles infect trees by laying eggs under the bark. The beetles may introduce a symbiotic microorganism into the sapwood that prevents the tree from repelling and killing the attacking beetles with tree pitch flow. The microorganism may also block water and nutrient transport within the tree. On the tree exterior, this results in popcorn-shaped masses of resin, called "pitch tubes," where the beetles have entered. The joint action of larval feeding and microorganism colonization kills the host tree within a few weeks of successful attack. When the tree is first attacked, it remains green. Usually within a year of attack, the needles will have turned red. In three to four years after the attack, very little foliage is left. Although the beetles may leave the tree to infect other tree hosts, a symbiotic microorganism may remain in the tree, and may be typified by a blue-gray staining of the wood. The wood source may be a lodgepole pine, ponderosa pine, Scotch pine, whitebark pine, limber pine, Douglas-fir, blue spruce, *Pinus contorta*, beech, western scrub, north coast scrub, or a sand, shore or knotty pine.

The moisture content of the wood particle may be adjusted by taking into account the degree of drying of the wood source. A wood source that is not dry enough may be difficult to manufacture into a wood particle. As used herein, "moisture content" is calculated by the formula $(A-B)/B \times 100\%$, where A is the mass of the wood particle and B is the oven-dry mass of the wood particle (e.g., after drying for 24 hours at $103+/-2°$ C.). The timber of living trees and freshly felled logs contains a large amount of water, which often constitutes over 50% of the woods' weight. The wood particle may have a moisture content of at least 4%, 5%, 6%, 7%, 8%, 9%, 10%, 11%, 12%, 13%, 14%, 15%, 16%, 17%, 18%, 19%, 20%, 21%, 22%, 23%, 24%, 25%, or any range thereof. In addition to a minimum moisture content, or in lieu thereof, the wood particle may have a moisture content of less than 25%, 24%, 23%, 22%, 21%, 20%, 19%, 18%, 17%, 16%, 15%, 14%, 13%, 12%, 11%, 10%, 9%, 8%, 7%, or any range thereof. Therefore, the moisture content of the wood particle may be from about 5% to about 10%, from about 5% to about 15%, from about 5% to about 20%, or from about 5% to about 25%. The moisture content of the wood particle may not be lower than 4%, and is not higher than 25%.

The size of the wood particle may be adjusted taking into account the intended application. For example, wood particles that are too small may not effectively disperse in certain environments, for example drill cuttings. On the other hand, small wood particles are useful in aqueous environments such as oil spills and filtering medium by forming small oil particles with high surface to volume ratios. Wood particles with desired maximum and/or minimum particle sizes may be obtained by using screens or other size separation technology known in the art. The wood particle may be relatively small, which may be a width smaller than approximately 1/32 to 1/16 inches. The wood particle may also be relatively large, which may be a width larger than approximately 3/8 to 1/2 inches. The wood particle may also be of mid-size, which may be a width between approximately 1/16 and 3/8 inches, between approximately 1/32 and 1/2 inches, or between approximately 1/4 and 1/8 inches.

2. Composition Comprising Plurality of Wood Particles

Also provided herein is a composition comprising a plurality of the wood particle, which may be of a uniform moisture content, size, and wood source. The composition may also comprise a mixture of wood particles of differing particular moisture contents, sizes, or wood sources. Depending on the intended application of the composition, the composition may comprise additional components to achieve desired performance features. Alternatively or in addition thereto, such components may be added to the waste site in combination with the composition of wood particles.

The additional component may be a nitrogen source, such as ammonia or urea. The component may also be an inorganic chemical that facilitates bioremediation, such as gypsum or other calcium salt, magnesium, or phosphorous. The component may also be an oxygen source, such as air, or an organic or inorganic peroxide. The component may also be a microbial growth accelerator, which increases the growth of a microorganism in the wood particles. The accelerator may comprise a source of live organisms, carbon, nitrogen or phosphorous to amend inorganic nutrient deficiencies and improve microbial growth. The accelerator may also provide an organic acid, such as oxaloacetic acid, pyruvic acid, acetic acid, citric acid or tartaric acid; an amino acid, such as cysteine, methionine, glycine, or lysine; or a vitamin, such as thiamine. An example of an accelerator is the BI-CHEM® ACCELERATOR series (available from Sybron Biochemicals Inc., Birmingham, N.J.).

The composition may not include a wood particle that has a moisture content other than at least 4%, 5%, 6%, 7%, 8%, 9%, 10%, 11%, 12%, 13%, 14%, 15%, 16%, 17%, 18%, 19%, 20%, 21%, 22%, 23%, 24%, 25%, or any range thereof. The composition may also not include a wood particle that has a moisture content of other than less than 25%, 24%, 23%, 22%, 21%, 20%, 19%, 18%, 17%, 16%, 15%, 14%, 13%, 12%, 11%, 10%, 9%, 8%, 7%, or any range thereof. Therefore, the moisture content of any wood particle in the composition may not be outside the range of from about 5% to about 10%, from about 5% to about 15%, from about 5% to about 20%, or from about 5% to about 25%. The moisture content of any wood particle in the composition may not be lower than 4%, and may not be higher than 25%.

Substantially all of the wood particles in the composition may have a moisture content of at least 4%, 5%, 6%, 7%, 8%, 9%, 10%, 11%, 12%, 13%, 14%, 15%, 16%, 17%, 18%, 19%, 20%, 21%, 22%, 23%, 24%, 25%, or any range thereof. In addition to a minimum moisture content, or in lieu thereof, substantially all of the wood particles in the composition may have a moisture content of less than 25%, 24%, 23%, 22%, 21%, 20%, 19%, 18%, 17%, 16%, 15%, 14%, 13%, 12%, 11%, 10%, 9%, 8%, 7%, or any range thereof. Therefore, the moisture content of substantially all of the wood particles in the composition may be from about 5% to about 10%, from about 5% to about 15%, from about 5% to about 20%, or from about 5% to about 25%. The moisture content of substantially all of the wood particles in the composition may not be lower than 4%, and may not be higher than 25%.

The composition may not include a wood particle that has a width other than smaller than approximately 1/32 to 1/16 inches. The composition may also not include a wood particle that has a width larger than other than approximately 3/8 to 1/2 inches. The composition may also not include a wood particle that is outside the range of between approximately 1/16 and 3/8 inches, between approximately 1/32 and 1/2 inches, or between approximately 1/4 and 1/8 inches.

Substantially all of the wood particles in the composition may have a width smaller than approximately 1/32 to 1/16 inches. Substantially all of the wood particles in the composition may also have a width larger than approximately 3/8 to 1/2 inches. Substantially all of the wood particles in the composition may also have a width between approximately 1/16 and 3/8 inches, between approximately 1/32 and 1/2 inches, or between approximately 1/4 and 1/8 inches.

3. Producing the Wood Particles

Also provided herein is a method of producing the wood particle. Starting with a mountain pine beetle-infested wood source, the wood may be reduced in size to produce wood chips. As commonly understood, wood chips are small wood pieces of unspecified size that are ground, broken or cut from trees, logs, or larger wood pieces using equipment such as a disc chipper, drum chipper, grinder or crusher, or any other equipment known for making such product or by-product in the art. The size of wood chips sizes can vary depending on the techniques, equipment and production methods used. For example, the wood chip can have a width of saw dust to approximately 2 inches.

The wood chip may then be dehydrated, or subjected to wood drying or wood seasoning, to reduce the moisture content of the wood chip. The wood chip may be air-dried, mechanically died, friction dried, kiln-dried, or subjected to any other drying process known in the art. In the drying process, the temperature, relative humidity and air circulation may be controlled to achieve the desired amount of drying, which may be relatively uniform or consistent among individual wood chips in the same batch. Depending on the starting moisture content of the wood chip, the duration of the drying time may be adjusted accordingly. The common practice in wood dehydrating is to ensure drying timber at the fastest possible rate without causing objectionable defects such as wood collapse, distortions or discoloration. Commonly, lodgepole pine wood chips are dehydrated by heating at 200° F. for 8 hr to reach a moisture content close to 0%. By contrast, the wood chips used to make the wood particles provided herein are subjected to substantially reduced temperature and/or drying times in order to prevent excess drying of the wood, for example to keep the moisture content of the wood chip products not lower than 4%. For example, the wood chip may be dried at a temperature no more than 155° F., 160° F., 165° F., 170° F., 175° F., 180° F., 185° F., 190° F., 195° F., 200° F., 205° F., 210° F., 215° F., 220° F., 230° F., 235° F., 240° F., 245° F., 250° F., 255° F., 260° F., 265° F., 270° F., 275° F., 280° F., 285° F., 290° F., 295° F., 300° F., 305° F., 310° F., 315° F., 320° F., 330° F., 335° F., 340° F., 345° F., or 350° F., depending on the starting moist content of the wood chip to achieve a final moisture content disclosed herein. The drying time for the wood chip may be for no more than 4, 5, 6, 7, 8, 9, 10, 15, 20, 25, 30, 35, 40, 45, 50, 55 or 60 minutes, depending on the starting moisture content of the wood chip to achieve a final moisture content between 4%-25%.

The dehydrated wood chip may be densified, which may be performed prior to or after dehydration. The biomass of the wood chip may be joined together by using various treatments, such as pressure and heat. In addition, the natural lignin, cellulose or hemicellulose in the wood may form a natural binder, such that the joined and processed wood biomass forms a variety of shapes and sizes for various uses. The wood chip may also be densified by impregnating its void volume with a synthetic or natural polymer in liquid form and then solidifying by chemical reaction or by cooling of the impregnant. Alternatively, wood density can be increased by compression in the transverse direction. The processes suitable for densifying the woody biomass on a production scale can be classified into two types: pelletizing (pelleting) and extrusion briquetting, either of which may be used to produce the wood particle. General types of equipment available for wood densification include a screw-type extruder, die type extruder and a compacting ram. Wood particles produced by extrusion can be in a form of chunk, crumble, lump, hunk or other irregular masses of varying widths depending upon equipment and die geometry.

The wood particles may be fractionated based on size. For example, screens may be used to select wood particles with a desired maximum and/or minimum particle size. For example, the wood particles may be separated to widths smaller than 1/32 to 1/16 inches. The wood particles may also be separated to widths larger than 3/8 to 1/2 inches. The wood particles may also be separated to widths between 1/32 and 1/16 inches, or between 3/8 and 1/2 inches. The wood particles may also be 1/4 to 1/8 inches in width.

4. Treating Hydrocarbon Waste

Also provided herein is a method of bioremediating hydrocarbon waste by contacting the waste with the composition provided herein. The waste may be bioremediated in situ or ex situ. In situ bioremediation involves bioremediating the waste at the site where it is produced, while ex situ involves the removal of the waste to be bioremediated elsewhere, such as at the oilfield waste pits or landfill where the waste is collected and stored.

The waste being bioremediated may be from drill mud and drill cuttings from oil and gas wellbores, drill fluid or solid waste deposit sites (such as pits or landfill), oil spills on water, oil and gas production waste, or ground surfaces. The drilling fluid may be any fluid that is used in hydrocarbon drilling or production operations, including muds or other fluids that contain suspended solids, or emulsified water or oil. The drill mud may be any type of water-base, oil-base, or synthetic-base drilling fluids, including all drill-in, completion and work over fluids. The drill cuttings may be solids that are carried by the drill mud in the drilling operations, including the bits of rocks ground by the drill bits.

For bioremediating contaminated drill fluids, solids or an admixture of both, the composition may comprise wood particles with widths between approximately 1/16 and 3/8 inches, or between approximately 1/4 and 1/8 inches. Further, according to a waste site-specific condition, such as an oxygen, temperature, moisture, or nutrient parameter, the composition may further comprise a nitrogen, mineral, and/or oxygen source that facilitates bioremediation. Alternatively or simultaneously, the composition may further comprise a microbial growth accelerator comprising a source of carbon, nitrogen or phosphorous, which may amend inorganic nutrient deficiencies and improve microbial growth.

For bioremediating an oil spill, the composition may comprise wood particles with widths no more than approximately 1/16 inches, or between approximately 1/32 and 1/16 inches. The composition may further comprise sustaining the mixture to allow bioremediation.

For bioremediating contaminated soil at a site, such as a drilling sink hole, oil pipeline leakage and drill fluid or solid waste pit or landfill, the composition may be applied by transferring the composition in to a hole that has been drilled into the ground soil to a predetermined depth. The composition may further comprise a nitrogen, mineral, or oxygen source. The composition may also comprise a microbial growth accelerator, which may comprise a source of carbon, nitrogen or phosphorous.

The invention claimed is:

1. A method of bioremediating hydrocarbon-containing waste, comprising:
   (a) providing a composition comprising a wood particle derived from a wood source affected by a mountain pine beetle; and
   (b) contacting the waste with the wood particle
   wherein the wood particles have a moisture content of 4% to 25%; and wherein the composition does not comprise wood particles with a moisture content that is outside the range of 4% to 25%,
   wherein the composition comprises a plurality of wood particles, wherein the wood particles comprise a microorganism associated with a mountain pine beetle, wherein the wood is selected from the group consisting of lodgepole pine, ponderosa pine, Scotch pine, white-bark pine, limber pine, Douglas-fir, blue spruce, *Pinus contorta*, beech, western scrub, north coast scrub, and sand, shore and knotty pine; wherein the microorganism is selected from the group consisting of *Grosmannia clavigera, Ophiostoma clavigerum, Ophiostoma montium, Leptographium longiclavatum, Entomocorticium, Entomocorticium dendroctoni, Ophiostoma montium, Ceratocystiopsis manitobensis, Pichia capsulate, Pichia scolytii, Pichia holstii, Bacillus subtilis, Pseudomonas*, and *Alcaligenes faecalis*.

2. The method of claim 1, wherein the wood particles have a moisture content of 5% to 20%; and wherein the composition does not comprise wood particles with a moisture content that is outside the range of 5% to 20%.

3. The method of claim 1, wherein the waste is selected from the group consisting of a drilling fluid, drill cutting, drilling mud, reserve pits, contaminated soil, drilling sink hole, oil pipeline leakage, oil and gas production waste, waste landfill and an oil spill.

4. The method of claim 2, wherein the waste is selected from the group consisting of a drilling fluid, drill cutting, drilling mud, reserve pits, contaminated soil, drilling sink hole, oil pipeline leakage, oil and gas production waste, waste landfill, and an oil spill.

5. The method of claim 1 wherein the composition further comprises a source selected from the group consisting of a nitrogen source, an oxygen source, a calcium source, a magnesium source, and a phosphorous source.

6. The method of claim 2, wherein the composition further comprises a source selected from the group consisting of a nitrogen source, an oxygen source, a calcium source, a magnesium source, and a phosphorous source.

7. The method of claim 5, wherein the composition further comprises a microbial growth accelerator.

8. The method of claim 1, wherein the composition does not comprise wood particles having a width outside the range of 1/32 to 1/2 inches.

9. The method of claim 1, wherein the wood particles have a width of 1/16 to 3/8 inches, and wherein the composition does not comprise wood particles with a width outside the range of 1/16 to 3/8 inches.

10. The composition of claim 1, wherein the wood particles have a width of 1/4 to 1/8 inches, and wherein the composition does not comprise wood particles with a width outside the range of 1/4 to 1/8 inches.

11. The method of claim 1, wherein the wood particle is extrusion densified.

* * * * *